J. R. EDICK.
CLUTCH RELEASE LEVER.
APPLICATION FILED JULY 18, 1919.

1,413,837.

Patented Apr. 25, 1922.
2 SHEETS—SHEET 1.

Inventor
J. R. Edick
By Lancaster Allwine
his Attorneys

J. R. EDICK.
CLUTCH RELEASE LEVER.
APPLICATION FILED JULY 18, 1919.
1,413,837.
Patented Apr. 25, 1922.
2 SHEETS—SHEET 2.
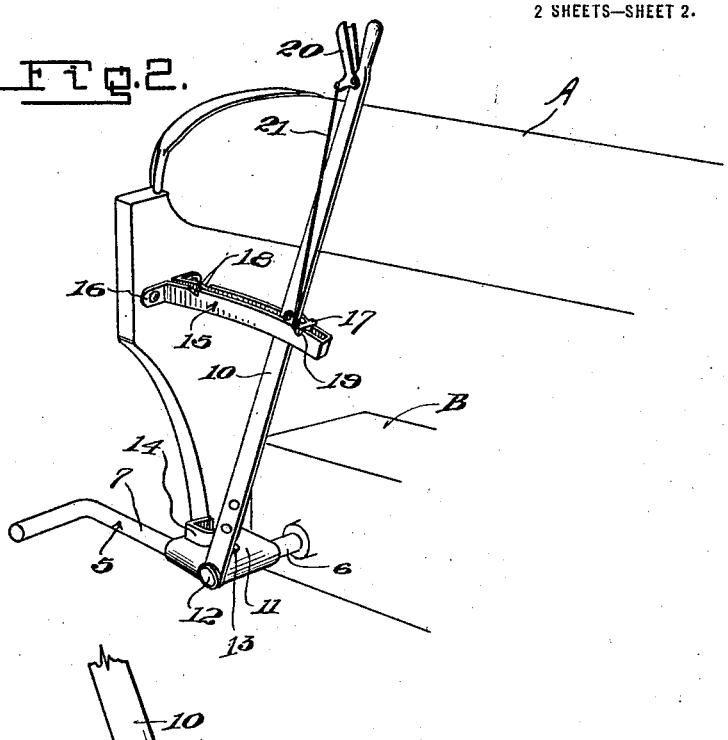
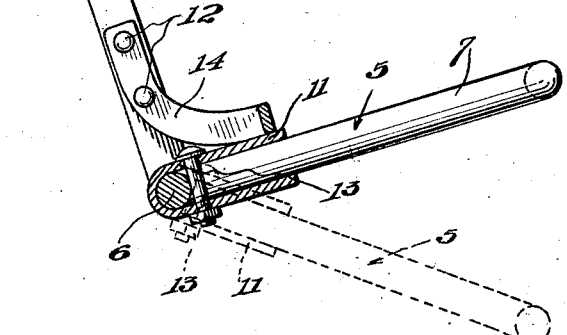
Inventor
J. R. Edick

UNITED STATES PATENT OFFICE.

JOHN R. EDICK, OF HUBBARD, IOWA.

CLUTCH-RELEASE LEVER.

1,413,837.  Specification of Letters Patent.  Patented Apr. 25, 1922.

Application filed July 18, 1919. Serial No. 311,722.

*To all whom it may concern:*

Be it known that I, JOHN R. EDICK, a citizen of the United States, residing at Hubbard, in the county of Hardin and State of Iowa, have invented certain new and useful Improvements in Clutch-Release Levers, of which the following is a specification.

This invention relates to a clutch release particularly designed for use on "Fordson" tractors, and an object of the invention is to provide means which may be attached to the clutch pedal of a "Fordson" tractor without necessitating any alteration thereto, and by means of which the clutch pedal may be operated to release the clutch arm or clutch while the operator is standing upon the ground.

In "Fordson" tractors, the clutch pedal is so arranged, that to operate it in releasing the clutch, it is necessary for the operator to be seated upon the seat of the tractor, and since these tractors are extensively used, while stationary, as power plants for driving various types of machinery, such as hay bailers, threshing machines, or the like, it is sometimes quite inconvenient to shift the gears, and also operate the clutch release which must be operated prior to the shifting of the gears, from the ground, it requiring unnecessary time for the operator to mount the seat of the tractor and then operate the respective pedals and levers.

It is an object of this invention to provide a lever which may be easily and conveniently attached to the clutch release arm or pedal so that this arm or pedal may be operated from the ground, thus overcoming the inconveniences above set forth, and also to provide a clutch releasing lever structure which is simple in construction and durable, as well as one which may be manufactured for or at a relatively small cost.

Other objects of the invention will appear in the following detailed description taken in connection with the accompanying drawings, forming a part of this specification, and in which drawings:

Figure 2 is a perspective view of the lever showing it applied, and

Figure 3 is a fragmentary section through the lever illustrating its manner of attachment to the clutch pedal or arm.

Figure 1:
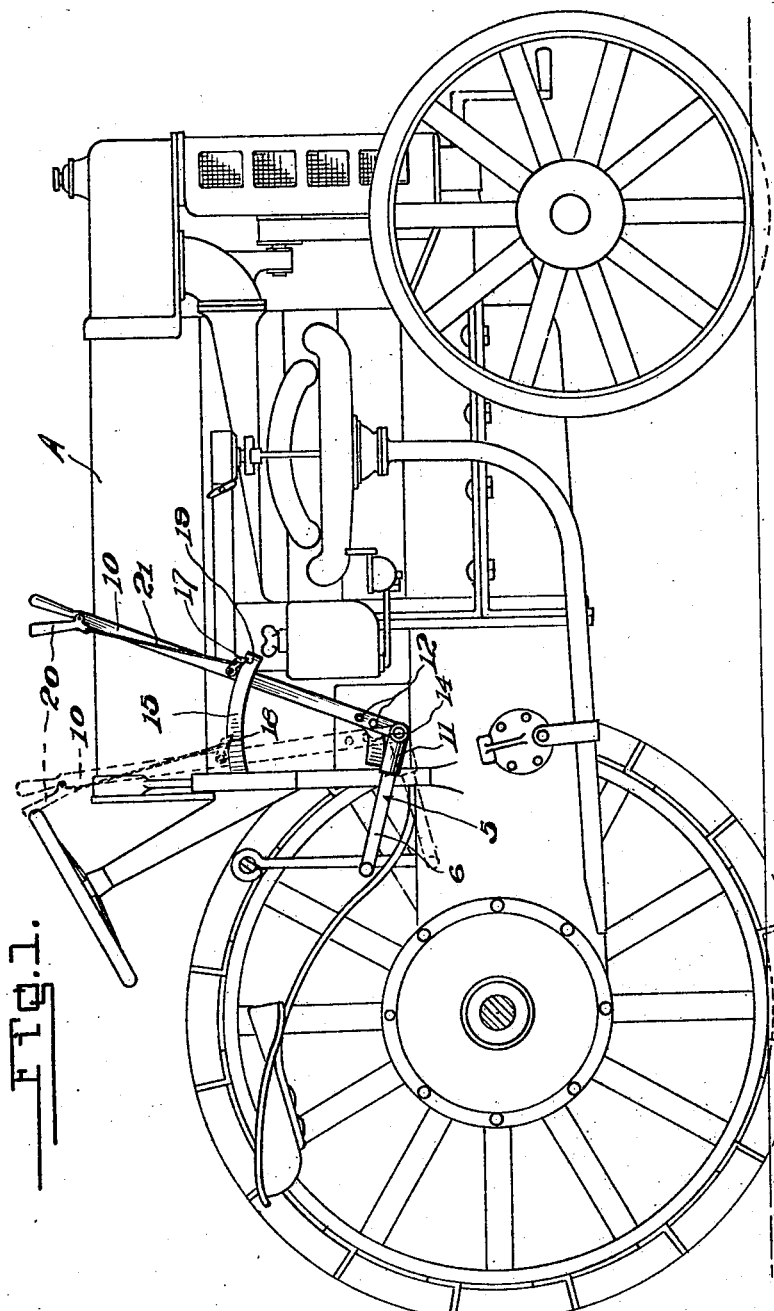
Figure 1 is a side elevation of a "Fordson" tractor having one traction wheel removed and showing the improved clutch release lever attached thereto.

Referring more particularly to the drawings, the clutch arm or pedal 5 of the "Fordson" tractor A is connected in the usual manner to the clutch mechanism, and it is provided with the angular portion 6 extending laterally from the clutch housing B having its outer end merging into the rearwardly extending portion 7, forming substantially a right angle, and it is at this angular portion, that the release lever 10 is attached. The lever 10 is connected, at its lower end to a clamping plate 11 as shown at 12, which clamping plate is bent about the arm 5 and securely clamped thereon by means of a bolt 13 which extends through the parallel upper and lower portions of the clamping plate structure 11. A bracing arm 14 may be formed integrally with or attached to the attaching plate structure 11 and it is attached to the lever 10 above the connection of the lever with the attaching plate structure as shown at 12. This lever 10 extends upwardly through a guiding quadrant 15, which is preferably formed of a single piece of flat strip or bar metal bent to provide parallel lengths, one engaging upon either side of the lever 10 which is clearly shown in Figure 2 of the drawings. The ends of the parallel lengths of the guiding quadrant 15 are then bent outwardly to form attaching ears 16 by means of which the guiding quadrant 15 is attached to the tractor A. A dog or pawl 17 is pivotally carried by the lever 10 and is adapted to engage either of the spaced notches 18 or 19 formed in the guiding quadrant 15 to hold the lever 10 in adjusted position and consequently holding the pedal arm 5 in adjusted position. A hand grip 20 is carried at the upper hand grip end of the lever 10 and is connected to the pawl 17 in the usual manner by a wire or rod 21 so as to permit operation of the pawl 17 to move it out of either of the notches 18 or 19.

By means of the lever structure 10 the clutch pedal or arm 5 may be operated to release the clutch, from the ground alongside the tractor A and through the medium of the pawl 17 and the notches 18 or 19, the lever and consequently the clutch pedal 5 may be held in adjusted positions to maintain the clutch pedal in such position during the shifting of the gears or for any desired time.

Changes in details may be made without departing from the spirit of this invention, but;

I claim:

1. The combination with the clutch pedal arm of a tractor, of a lever rigidly and detachably connected to said arm for operating the arm, and means for holding said lever in adjusted position.

2. The combination with the clutch pedal arm of a tractor, of a hand lever, an attaching plate connected to said hand lever and engaging over the clutch pedal arm for connecting the hand lever and clutch pedal arm for synchronous movement.

3. The combination with the clutch pedal arm of a tractor, of a hand lever, an attaching plate connected to said hand lever and engaging over the clutch pedal arm for rigidly connecting the hand lever and clutch pedal arm for synchronous movement, a stationary guiding quadrant adapted to be carried by the tractor and having notches therein, and means carried by said lever arm for engagement with said notches to hold the clutch pedal arm is adjusted position.

4. The combination with a clutch pedal arm of a clutch, of an attaching plate engaging over said clutch pedal arm, a hand lever, a bracing arm rigidly disposed upon said hand lever and engaging said attaching plate for operation of the clutch pedal arm by the hand lever.

5. The combination with the clutch pedal arm of a clutch, of a hand lever, an attaching plate connected to said hand lever and engaging over the clutch pedal arm for connecting the hand lever and clutch pedal arm for synchronous movement, and means for holding said lever in adjusted position.

6. The combination with a shaft, of a foot pedal rigidly connected to said shaft, an attaching plate detachably mounted over said foot pedal and shaft, and a hand lever mounted on said attaching plate for operating said shaft.

JOHN R. EDICK.